United States Patent
Jung et al.

(10) Patent No.: US 10,180,369 B2
(45) Date of Patent: Jan. 15, 2019

(54) FAULT DIAGNOSIS APPARATUS FOR BRAKE OF TRAIN AND AUTOMATIC TRAIN OPERATION EQUIPMENT DUE TO THE REDUCTION BRAKING PERFORMANCE USING THE SAME AND FAULT DIAGNOSIS METHOD FOR BRAKE OF TRAIN

(71) Applicant: LSIS CO., LTD., Gyeonggi-do (KR)

(72) Inventors: Jong-Chul Jung, Gyeonggi-do (KR); Yong-Gee Cho, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 41 days.

(21) Appl. No.: 15/393,992

(22) Filed: Dec. 29, 2016

(65) Prior Publication Data

US 2017/0278319 A1    Sep. 28, 2017

(30) Foreign Application Priority Data

Mar. 25, 2016 (KR) .................. 10-2016-0035858

(51) Int. Cl.
*G01L 5/28* (2006.01)
*B61L 15/00* (2006.01)
(Continued)

(52) U.S. Cl.
CPC .......... *G01L 5/286* (2013.01); *B61L 15/0081* (2013.01); *B61L 23/02* (2013.01); *B61L 25/021* (2013.01); *G01M 17/08* (2013.01)

(58) Field of Classification Search
CPC ...... G07C 5/0808; G01L 5/286; G01M 17/08; B61L 23/02; B61L 25/021; B61L 15/0081
See application file for complete search history.

(56) References Cited

U.S. PATENT DOCUMENTS 6,299,261 B1 * 10/2001 Weiberle ................. B60T 8/885
                                              303/122.04
2001/0039230 A1 * 11/2001 Severinsky ............ B60H 1/004
                                              477/3
(Continued)

FOREIGN PATENT DOCUMENTS

CN            104220880 A      12/2014
CN            102616245 B       7/2015
(Continued)

*Primary Examiner* — Behrang Badii
*Assistant Examiner* — Daniel L Greene
(74) *Attorney, Agent, or Firm* — K&L Gates LLP

(57) ABSTRACT

The present invention relates to a fault diagnosis apparatus for a brake of a train, an automatic train operation system operated due to degradation of braking performance using the same, and a fault diagnosis method for the brake of the train. In particular, the present invention is directed to determining that a fault has occurred in the brake when the difference between the current acceleration of the train and the required acceleration is greater than or equal to a reference value and safely moving the train to a stopping point through a powering operation or coasting operation such that emergency braking is not applied by an automatic train protection (ATP) system if the fault has occurred in the brake. When a fault occurs in the brake of the train, the train is automatically operated such that emergency braking is not triggered by an ATP system.

2 Claims, 7 Drawing Sheets

(51) Int. Cl.
*B61L 23/02* (2006.01)
*B61L 25/02* (2006.01)
*G01M 17/08* (2006.01)

(56) References Cited

U.S. PATENT DOCUMENTS

| | | | | |
|---|---|---|---|---|
| 2007/0168096 A1* | 7/2007 | Boutin | ............... | G05B 9/03 |
| | | | | 701/45 |
| 2009/0288921 A1* | 11/2009 | Meckel | ............... | F16D 65/12 |
| | | | | 188/73.1 |
| 2011/0257869 A1* | 10/2011 | Kumar | ............... | B61L 3/006 |
| | | | | 701/103 |
| 2012/0261228 A1* | 10/2012 | Chen | ............... | F16D 48/06 |
| | | | | 192/82 T |
| 2012/0277940 A1* | 11/2012 | Kumar | ............... | B61L 27/0027 |
| | | | | 701/20 |
| 2016/0001799 A1* | 1/2016 | Cook | ............... | B61H 11/00 |
| | | | | 105/35 |
| 2016/0009304 A1* | 1/2016 | Kumar | ............... | B61L 27/0027 |
| | | | | 701/19 |
| 2016/0355198 A1* | 12/2016 | Dulmage | ............... | H04L 69/18 |

FOREIGN PATENT DOCUMENTS

| | | |
|---|---|---|
| EP | 2 191 998 A1 | 6/2010 |
| EP | 2 746 131 A1 | 6/2014 |
| JP | H8-207771 A | 8/1996 |
| JP | H11-346406 A | 12/1999 |
| JP | 2005-231447 A | 9/2005 |
| JP | 2008-247217 A | 10/2008 |
| JP | 2011-78161 A | 4/2011 |
| KR | 10-2006-0077586 A | 7/2006 |

\* cited by examiner ized by a computer 20, a speed sensor 1 installed on wheels of the train to generate a pulse signal corresponding to the rate of rotation of the wheels during travel; a frequency/voltage converter 2 for converting the frequency of an discontinuous pulse detected through the speed sensor 1 into a voltage; a first A/D converter 3 for converting an analog train speed voltage output from the frequency/voltage converter 2 into a digital signal; a train speed detector 4 for receiving the output signal of the first A/D converter 3 input thereto and detecting the current travel speed of the train; a counter 5 for counting the discontinuous pulse detected through the speed sensor 1; a position information detector 6 for receiving an output signal of the counter 5 and detecting the position of the train by calculating the travel distance of the train corresponding to the number of pulses; a block force measurement sensor installed in a brake of the train to detect a block force; a braking force measurement sensor installed in the brake of the train to detect braking force; a strain amplifier 18 for amplifying detection signals of block force and braking force detected through the block force and braking force measurement sensor 14; a second A/D converter 19 for converting the analog signals of block force and braking force output through the strain amplifier 18 into digital signals; and the computer 20 for receiving and memorizing output signals from the aforementioned elements in real time and for, when a fault occurs in a specific brake, memorizing and outputting the travel speed, position, state information about various relays, and fault status information about the brake given at that time.

FAULT DIAGNOSIS APPARATUS FOR BRAKE OF TRAIN AND AUTOMATIC TRAIN OPERATION EQUIPMENT DUE TO THE REDUCTION BRAKING PERFORMANCE USING THE SAME AND FAULT DIAGNOSIS METHOD FOR BRAKE OF TRAIN

CROSS REFERENCE TO RELATED APPLICATION

This application claims the benefit of Korean Patent Application No. 10-2016-0035858, filed on Mar. 25, 2016, entitled "FAULT DIAGNOSIS APPARATUS FOR BRAKE OF TRAIN AND AUTOMATIC TRAIN OPERATION EQUIPMENT DUE TO THE REDUCTION BRAKING PERFORMANCE USING THE SAME AND FAULT DIAGNOSIS METHOD FOR BRAKE OF TRAIN", which is hereby incorporated by reference in its entirety into this application.

BACKGROUND

1. Technical Field

The present invention relates to a fault diagnosis apparatus for a brake of a train, an automatic train operation system operated due to degradation of braking performance using the same, and a fault diagnosis method for the brake of the train, and more particularly, to a fault diagnosis apparatus for a brake of a train, an automatic train operation system using the same and a fault diagnosis method which are directed to diagnosing performance degradation or a fault in the brake of the train and report the diagnosis result to a control system, and safely moving the train to a stopping point through a powering operation or coasting operation such that emergency braking is not applied by an automatic train protection (ATP) system.

2. Description of the Related Art

Typically, a train refers to a vehicle which travels along a rail or a corresponding track, namely a railroad using wheels and is driven using motive power other than manpower or output. The train is provided with an engine for movement and a brake for controlling the speed of the moving train or stopping the moving train. If performance of the brake of the train is low, the train may not be stopped at an intended place and the train may not be safe from accidental dangers. To address such issues, various kinds of brakes including an adhesive brake, a non-adhesive brake, a tread brake, a disc brake, a generative brake, a regenerative brake, an eddy current disc brake, an engine brake, and a converter brake have been developed. However, even a train equipped with a brake exhibiting the best performance may have an accident if a fault occurs in the brake. Accordingly, not only research on improvement of brake performance but also research on fault diagnosis technology has been steadily conducted.

FIG. 1 is a conceptual diagram illustrating a conventional fault diagnosis apparatus for a train brake.

As shown in FIG. 1, the conventional fault diagnosis system for a train brake includes: a powering signal detector 8 for detecting voltages of contact signals of various relays installed in an electric train; a first DC/DC converter 11 for converting DC voltages output from the powering signal detector 8 and voltages of a VCB state and signals for dead section entrance/pass into DC voltages which are recogniz- In addition, the conventional fault diagnosis system for a train brake configured as above measures block force (braking pressure) and braking force, MASCON powering, braking state information, VCB state, dead section entrance/pass status, a travel speed and position information during travel and recognizes braking force according to change in the train to determine a fault status.

Although the conventional fault diagnosis system presents a fault diagnosis method for a brake of a train, this method is not based on a dynamic model. Thereby, the conventional fault diagnosis system causes the driver to measure not only MASCON input information but also the braking pressure and braking force.

In addition, in a wireless communication-based train control system, a speed limit for travel of a train is presented by an automatic train protection (ATP), which is an automatic system for protection of the train. If the travel speed of the train exceeds the speed limit, the ATP functions to stably stop the train by outputting an emergency braking command in order to protect the train. When the train is automatically operated in the automatic mode or unmanned mode, the automatic train operation (ATO) system substituting the engineer configures a travel speed profile based on the train speed limit received from the ATP, and accelerates or decelerates the train by transferring powering output to a powering device of the train or transferring common braking output to the brake of the train. For the common braking output, a common braking command is output is output to the brake if the current speed of the train exceeds a speed in the configured speed profile. Upon receiving the signal, the brake controls the train to decelerate by generating braking force in the brake system. However, if the brake of the train or an interface between the ATO and the brake malfunctions and thus braking performance is degraded, desired braking force is not generated in the train, and thus the speed of the train may exceed a speed in the configured speed profile. Thereby, an emergency braking command may be output from the ATP, and the train may stop on the way to a station. Application of emergency braking to the train in the automatic mode or unmanned mode is managed by the ATP to ensure a safe travel of the train. If the speed of the train exceeds the speed limit for safety, an emergency braking command is output to the train to decelerate the train, and the emergency braking state is maintained until the train stops. Once the train stops, emergency braking is released. Once the train is stopped by emergency braking on the way to a station, the train may be automatically restarted by a restart command from the control center after the emergency braking output is mitigated, but performance may still be degraded because the cause of performance degradation of the brake of the train has not been eliminated. In addition, when the train is restarted and the speed of the train exceeds a speed in the configured speed profile, emergency braking may be applied by the ATP. In this case, the train will be stopped again on the way to a station, and this operation will be repeated until the train arrives at the next station. In another case, the engineer may need ride on the train stopped on the way to the next station and to manually move the train to the next station.

Since the train can avoid collision with a following train only when the fault diagnosis of the brake of the train is performed and the train having a malfunctioning brake is moved to a safe position, the train may be considered as finally having escaped from a danger of an accident. However, the conventional fault diagnosis apparatus for a brake of a train performs only diagnosis of faults of the brake of the train, and fails to present a technology for moving the train to a safe position when the brake malfunctions. Accordingly, the conventional fault diagnosis apparatus cannot perfectly protect the train from an accident when the brake malfunctions.

SUMMARY

It is an aspect of the present invention to provide a fault diagnosis apparatus and method for a brake of a train based on a dynamic model for diagnosing performance degradation or faults of the brake of the train and deliver the diagnosis information to a control system during travel of the train automatically operated by an ATO system.

It is another aspect of the present invention to provide an automatic train operation system operated due to degradation of braking performance to prevent emergency braking from being applied by an ATP system and to ensure safe arrival of the train at the next station through a powering or coasting operation to safely evacuate passengers and have the train repaired when a command for an degraded mode operation is received from a control system recognizing occurrence of performance degradation or faults of the brake.

It should be noted that objects of the present invention are not limited to the aforementioned object, and other objects of the present invention will be apparent to those skilled in the art from the following descriptions. In addition, it will be appreciated that the objects and advantages of the present invention can be implemented by means recited in the appended claims and a combination thereof.

In accordance with one aspect of the present invention, a fault diagnosis apparatus for a brake of a train includes a required braking force calculator configured to calculate expected required braking force of the train based on current speed information about the train and braking notch information, a current acceleration calculator configured to calculate a current acceleration based on the current speed information and previous speed information about the train, a train model unit configured to calculate a required acceleration based on the current speed information about the train, the required braking force, railroad curvature information and railroad gradient information, and a brake performance monitoring unit configured to determine that a fault has occurred in the brake of the train when a difference between the current acceleration and the required acceleration is greater than or equal to a reference value.

In accordance with another aspect of the present invention, an automatic train operation system operated due to braking performance degradation includes a brake fault diagnosis unit configured to diagnose a fault status of a brake of a train, a travel speed profile generator configured to generate, when a fault occurs in the brake of the train, a travel speed profile such that the train moves to a stopping point at a speed within a speed limit through a powering operation or coasting operation, a travel speed controller configured to control a travel speed of the train according to the travel speed profile.

Herein, the brake fault diagnosis unit may include a required braking force calculator configured to calculate expected required braking force of the train based on the current speed information about the train and braking notch information, a current acceleration calculator configured to calculate a current acceleration based on the current speed information and previous speed information about the train, a train model unit configured to calculate a required acceleration based on the current speed information about the train, the required braking force, railroad curvature information and railroad gradient information, and a brake performance monitoring unit configured to determine that a fault has occurred in the brake of the train when a difference between the current acceleration and the required acceleration is greater than or equal to a reference value.

In accordance with another aspect of the present invention, a fault diagnosis method for a brake of a train includes a required braking force calculator calculating, upon receiving a braking command, the required braking force based on current speed information about the train and braking notch information a train model unit calculating a required acceleration based on the current speed information about the train, and railroad curvature and railroad gradient information about a railroad followed by the train and railroad gradient information, a current acceleration calculator calculating a current acceleration of the train based on the current speed information and previous speed information about the train, and a brake performance monitoring unit determining, when a difference between the current acceleration and the required acceleration is greater than or equal to a reference value, that a fault has occurred in the brake of the train.

The required acceleration ($A_D(k)$) may be defined as $$A_D(k) = \frac{-F_B(k) - c_1 - c_2 V(k) - c_3 V(k)^2 - c_4/r(k) - mg\sin\theta(k)}{m},$$

wherein $F_B(k)$ is the required braking force, $c_1$, $c_2$ and $c_3$ are constants related to travel resistance, $V(k)$ is a current speed of the train, m is an equivalent mass of the train, g is a gravitational acceleration constant, $r(k)$ is a railroad curvature, $c_4$ is a constant related to curvature resistance, and $\theta(k)$ is a railroad gradient.

The current acceleration ($A(k)$) may be defined as $$A(k) = \frac{V(k) - V(k-1)}{\Delta},$$

wherein V(k) is a current speed of the train, V(k−1) is a previous speed of the train, and Δ is a sampling period.

The brake performance monitoring unit determining that a fault has occurred in the brake of the train includes the brake performance monitoring unit determining a performance degradation rate based on the difference between the current acceleration and the required acceleration, wherein the performance degradation rate (DR) is defined as $$DR = \frac{1}{(1-\alpha)} \times \left( \left| \frac{A_D(k) - A(k)}{A_D(k)} \right| - \alpha \right) \times 100[\%],$$

wherein $\alpha$ is the reference value between 0 and 1, $A_D(k)$ is the required acceleration, and $A(k)$ is the current acceleration.

According to an embodiment of the present invention, a fault of a brake of a train is detected and transmitted to a control system. Thereby, the control center may recognize abnormality of the brake and promptly establish countermeasures.

According to an embodiment of the present invention, when a fault occurs in the brake of the train, the train is automatically operated such that emergency braking is not triggered by an ATP system. Thereby, the train may be moved to a safe place and anxiety may not be caused among the passengers.

According to an embodiment of the present invention, since fault diagnosis information about the brake of a train is transmitted to a control system by an ATO system in the train, the control system may identify the cause of emergency braking when emergency braking is triggered by the ATP system in the train.

DETAILED DESCRIPTION

Figure 1:
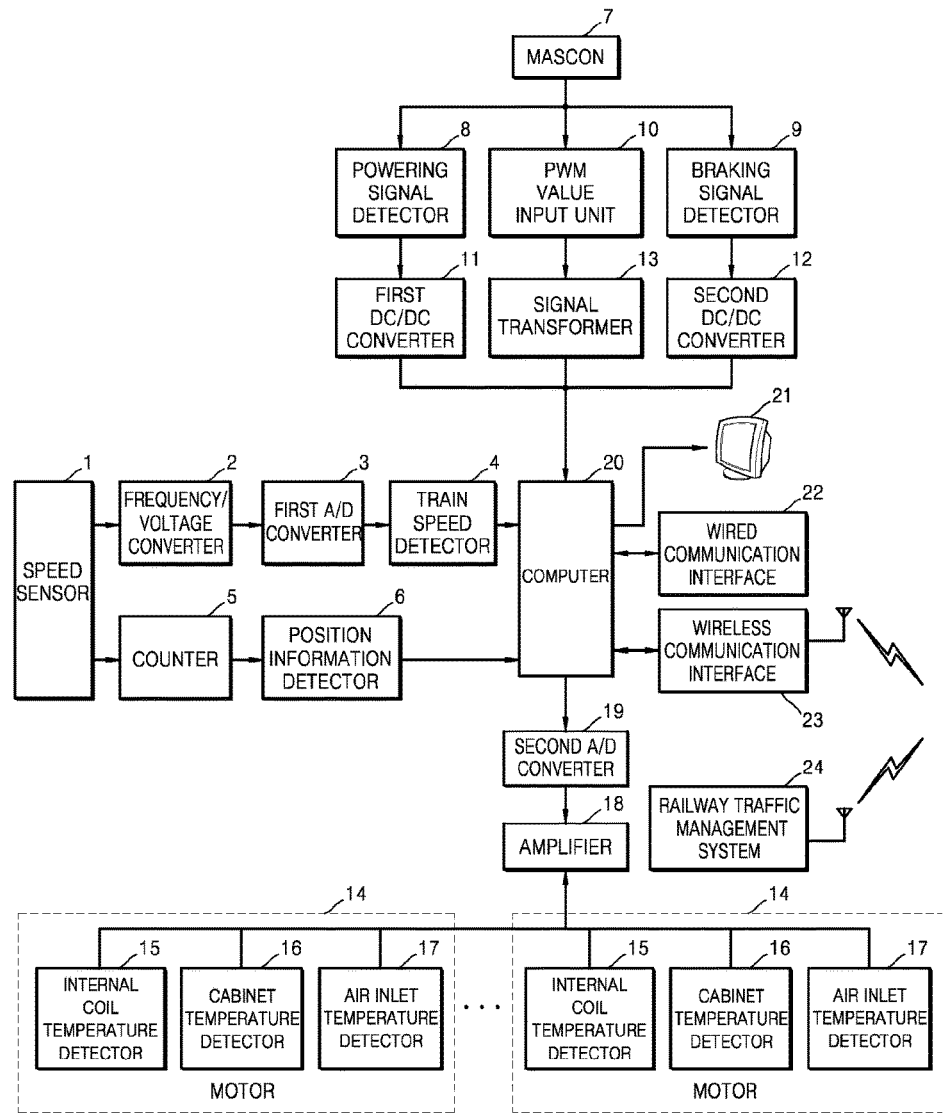
FIG. 1 is a conceptual diagram illustrating a conventional fault diagnosis apparatus for a brake of a train.

The aforementioned objects, advantages and features of the invention will be set forth in detail with reference to the accompanying drawings such that those skilled in the art can easily practice the present invention. In describing embodiments disclosed in this specification, relevant well-known technologies may not be described in detail in order not to obscure the subject matter of the present invention. Hereinafter, embodiments of the present invention will be described in detail with reference to the accompanying drawings. Like reference numerals are used to refer to the same or like elements throughout the drawings.

Figure 2:
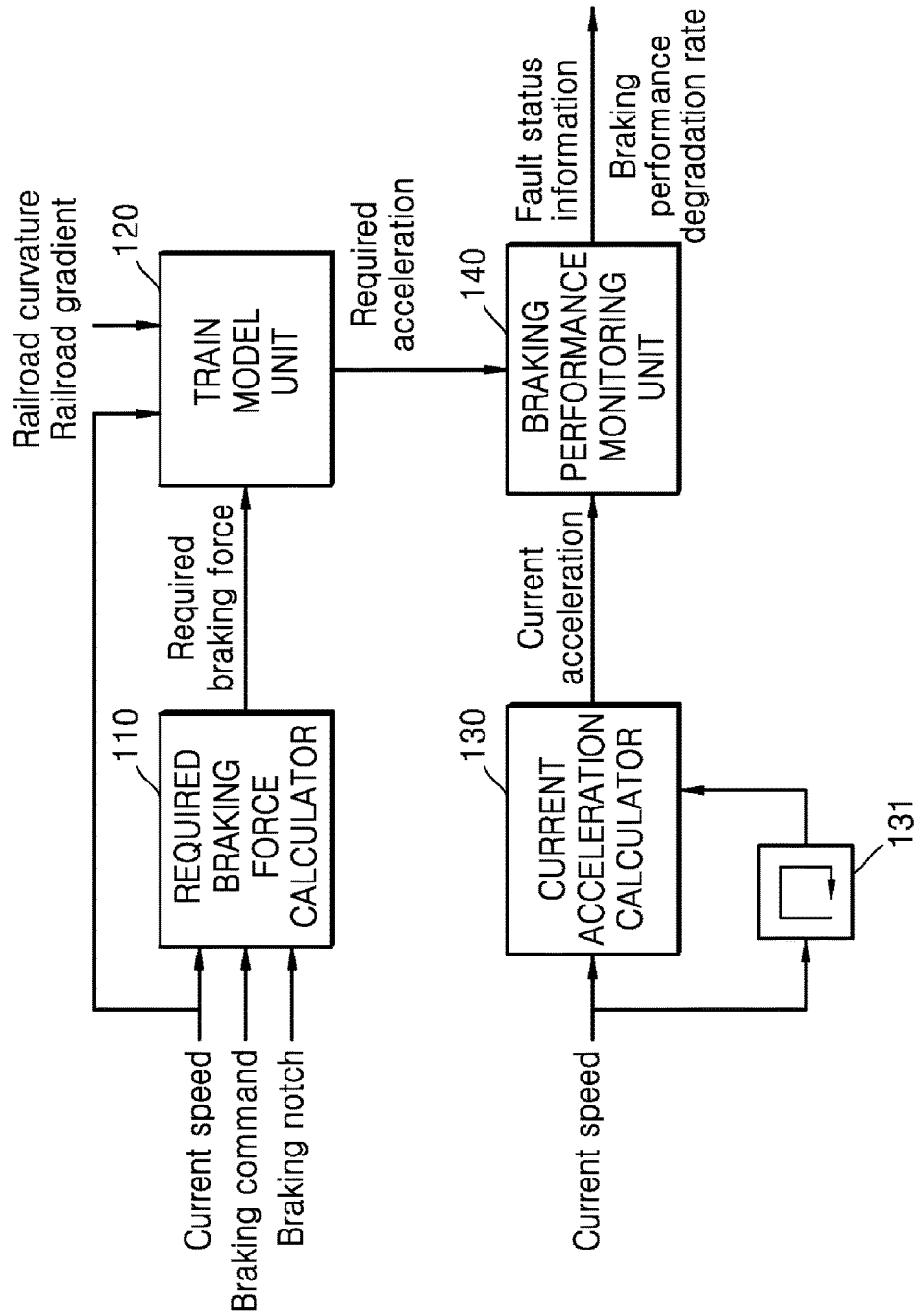
FIG. 2 is a block diagram illustrating a fault diagnosis apparatus for a brake of a train according to an embodiment of the present invention.

FIG. 2 is a block diagram illustrating a fault diagnosis apparatus for a brake of a train according to an embodiment of the present invention.

As shown in FIG. 2, a fault diagnosis apparatus for a brake of a train according to an embodiment of the present invention includes a required braking force calculator 110 configured to calculate required braking force of the train, a train model unit 120 configured to calculate a required acceleration of the train, a current acceleration calculator 130 configured to calculate a current acceleration of the train, and a brake performance monitoring unit 140 configured to monitor the brake performance based on the current acceleration of the train and required acceleration.

The required braking force calculator 110 calculates required braking force expected to be taken to stop the train, based on a braking command and braking notch information, which are calculated by an automatic train operation (ATO) system, and the current speed of the train. Herein, the current speed of the train may be measured using a sensor such as, for example, a tachometer provided to the train. However, embodiments of the present invention are not limited thereto. Not only the aforementioned sensor but also a global positioning system (GPS) may be used to measure the current speed of the train. The braking command and braking notch information are output from the speed controller of the ATO system and fed back to the required braking force calculator. The required braking force of the brake of the train is calculated according to a braking notch value. In calculating the required braking force, an idle running time in braking according to the mechanism of air braking needs to be considered. Herein, the idle running time in braking refers to a time taken to generate sufficient braking force for reducing the speed of the train after a control command is applied to the train which is travelling through a powering operation or coasting operation. Since the required braking force is not obtained for the idle running time, the idle running time needs to be considered in calculating the required braking force.

The current acceleration calculator 130 calculates the current acceleration using the current speed information and previous speed information about the train. When the current speed information about the train is received, it is stored in a memory 131, and then is used as the previous speed information in the next step. The current acceleration A(k) calculated by the current acceleration calculator 130 is given by Equation 1.

$$A(k) = \frac{V(k) - V(k-1)}{\Delta} \qquad \text{Equation 1}$$

In Equation 1, V(k) denotes the current speed of the train, V(k−1) denotes the previous speed of the train, and Δ denotes a sampling period.

The train model unit 120 calculates a required acceleration using the current speed of the train, the required braking force needed to stop the train, the curvature of a railroad along which the train is currently operated, and railroad gradient information. The required acceleration refers to an acceleration of the train expected when the brakes are put on the travelling train by the required braking force. Herein, the train model used for the train model unit 120 to calculate the required acceleration is a longitudinal train model with a first degree of freedom (1 DOF). The required acceleration $A_D(k)$ based on this model is given by Equation 2.

$$A_D(k) = \frac{-F_B(k) - c_1 - c_2 V(k) - c_3 V(k)^2 - c_4/r(k) - mg\sin\theta(k)}{m} \quad \text{Equation 2}$$

In Equation 2, $F_B(k)$ is required braking force of the train, and $c_1$, $c_2$ and $c_3$ are constants related to travel resistance of the train. $V(k)$ is the current speed of the train, m is an equivalent mass of the train, and g is a gravitational acceleration constant. $r(k)$ denotes a railroad curvature of a railroad along which the train is currently operated, and $c_4$ is a constant related to curvature resistance. $\theta(k)$ is a railroad gradient of the railroad along which the train is currently operated.

When the value obtained by subtracting the sum of the travel resistance, curvature resistance and gradient resistance from the required braking force exerted on the train is divided by the equivalent mass of the train, the required acceleration of the train may be obtained. The travel resistance exerted on the train includes frictional resistance and air resistance, and is a function of the speed of the train. The gradient resistance calculated according to the gradient of the railroad is proportional to the equivalent mass of the train and the degree of gradient of the railroad. In addition, the curvature resistance calculated according to the curve of the railroad is inversely proportional to the curvature. That is, an expected required acceleration may be calculated using the current speed of the train, braking notch, required braking force expected according to the current speed of the train, and the gradient and curvature of the railroad at the corresponding position.

The brake performance monitoring unit 140 determines the fault status of the train brake 600. In addition, the brake performance monitoring unit 140 may calculate the degree of performance degradation of the brake. To this end, the brake performance monitoring unit 140 includes a brake fault determination module and a brake performance degradation rate calculation module.

The brake fault determination module receives the current acceleration of the train calculated by the current acceleration calculator 130 and the required acceleration calculated by the train model unit 120, and compare the same. If the difference between the current acceleration of the train and the required acceleration is greater than or equal to a set value, the brake fault determination module determines that performance of the brake has been degraded. Herein, if the performance degradation is severe, it is determined that a fault has occurred in the brake. The algorithm for the determination is given by Equation 3 below.

if $DR \geq \delta$, fault else no fault    Equation 3

In Equation 3, DR denotes a brake performance degradation rate of the train and has a value between 0% and 100%. In addition, $\delta$ is a reference value for determination of the fault status of the brake of the train, which is set between 0 and 100. That is, if the performance degradation rate is greater than or equal to $\delta$, it is determined that a fault has occurred in the train brake 600. If the performance degradation rate is less than $\delta$, it is determined that the train brake 600 is in the normal condition.

Figure 3:
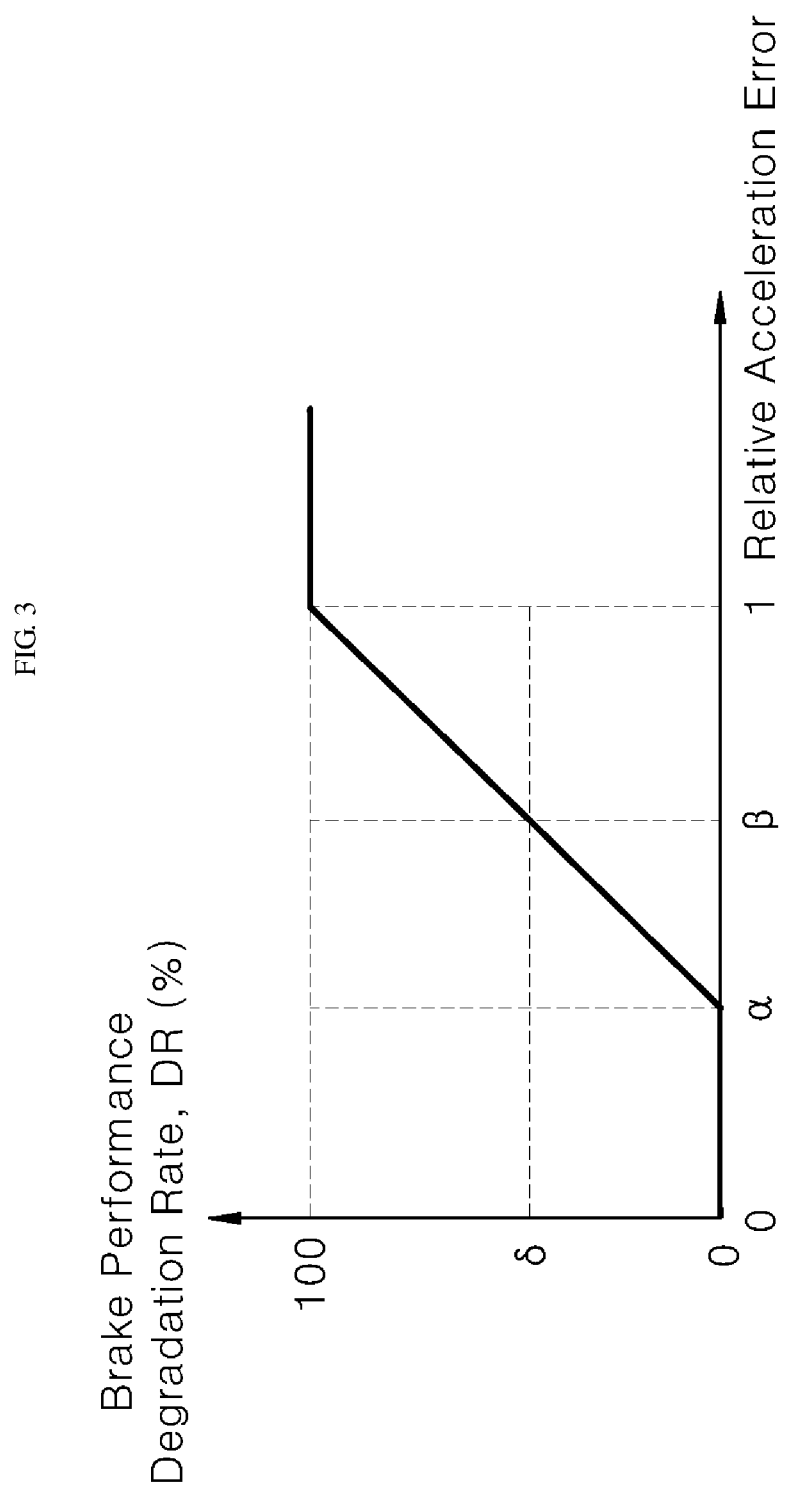
FIG. 3 is a graph depicting a performance degradation rate calculated by a fault diagnosis apparatus for a brake of a train according to an embodiment of the present invention.

FIG. 3 is a graph depicting a performance degradation rate calculated in a fault diagnosis apparatus for a brake of a train according to an embodiment of the present invention.

The brake performance degradation rate calculation module calculates a performance degradation rate of the train brake 600. The calculated performance degradation rate is depicted by the graph of FIG. 3. Even if the brake fault determination module determines that the train brake 600 is in the normal condition, the train brake 600 may undergo performance degradation. In this case, the performance degradation rate DR may be estimated in Equation 4 below.

$$DR = \frac{1}{(1-\alpha)} \times \left(\left|\frac{A_D(k) - A(k)}{A_D(k)}\right| - \alpha\right) \times 100[\%] \quad \text{Equation 4}$$

In Equation 4, $\alpha$ is a set value between 0 and 1. If the absolute value of the difference in relative acceleration is less than or equal to the set value $\alpha$, it is determined that the performance degradation rate is 0%. If the absolute value of the difference in relative acceleration is greater than or equal to 1, it is determined that the performance degradation rate is 100%.

Next, a description will be given of an automatic train operation system operated due to braking performance degradation of a train according to an embodiment of the present invention, with reference to the accompanying drawings. In the following description, elements identical to elements of the fault diagnosis apparatus for a brake of a train described above will not be described or will be described briefly.

Figure 4:
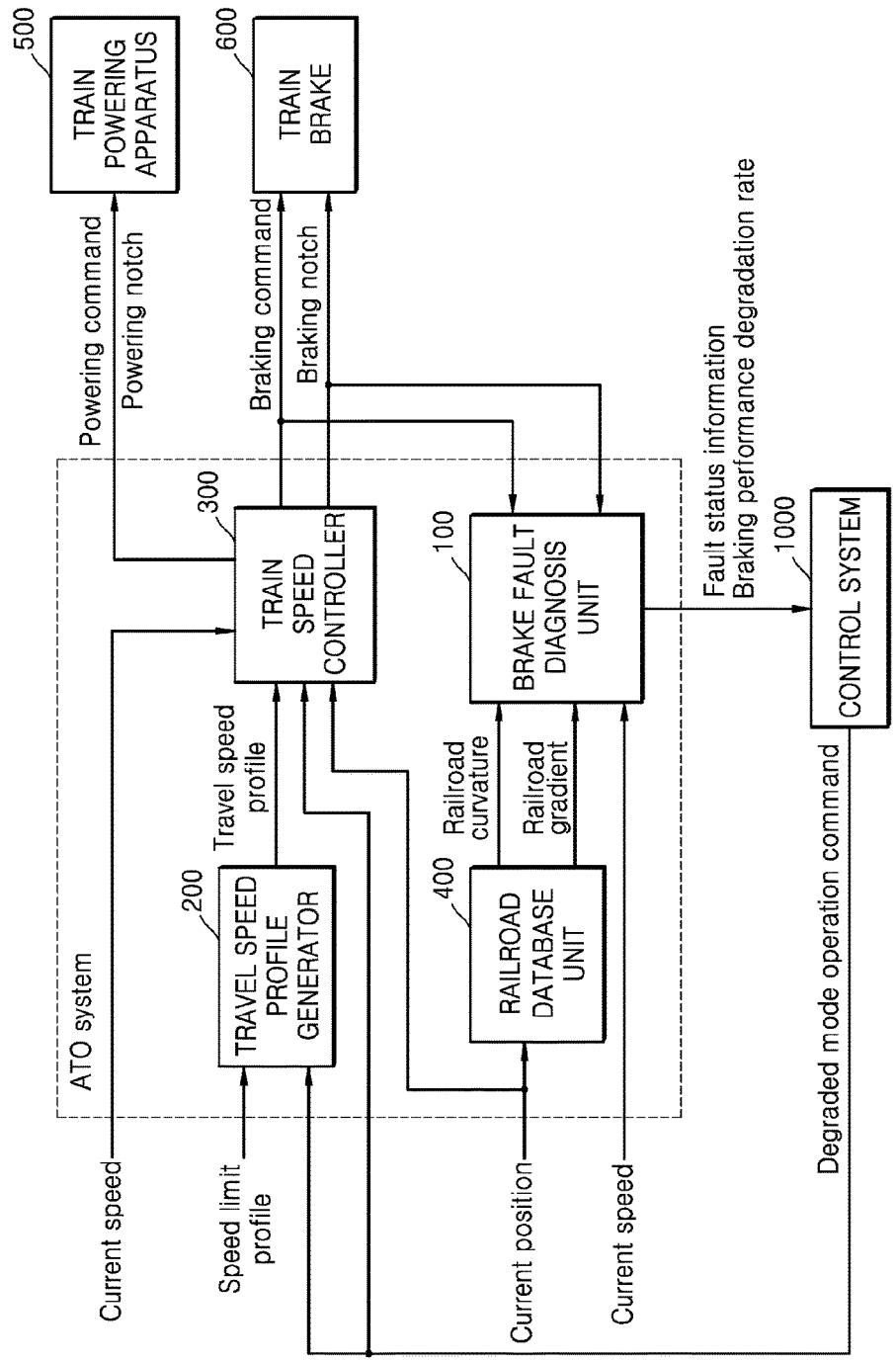
FIG. 4 is a block diagram illustrating an automatic train operation system operated due to braking performance degradation of a train according to an embodiment of the present invention.

FIG. 4 is a block diagram illustrating an automatic train operation system operated due to braking performance degradation of a train according to an embodiment of the present invention.

As shown in FIG. 4, an automatic train operation system operated due to braking performance degradation of a train according to an embodiment of the present invention includes a brake fault diagnosis unit 100 configured to diagnose a fault status of a brake of the train, a travel speed profile generator 200 configured to generate a travel speed profile of the train, a travel speed controller 300 configured to control the speed of the train according to the current position of the train and the travel speed profile, and a railroad database unit 400 configured to store railroad information about the railroad along which the train travels. Herein, the brake fault diagnosis unit 100 is identical to the fault diagnosis apparatus for a brake described above, and thus a description thereof will be omitted.

The travel speed profile generator 200 generates a travel speed profile needed for the ATO system in the train to perform automatic operation, using the speed limit profile information received from the automatic train protection (ATP) system in the train. Herein, the travel speed profile may be generated such that the travel speed profile approximates the speed limit profile. If the travel speed profile generator 200 receives a degraded mode operation command from a control system 1000, the travel speed profile generator 200 considers that the train brake 600 is not exhibiting normal braking performance due to a fault. Thereafter, the travel speed profile generator 200 generates a travel speed profile for safely moving the train to the next station or the base station through a powering operation and a coasting operation.

Figure 5:
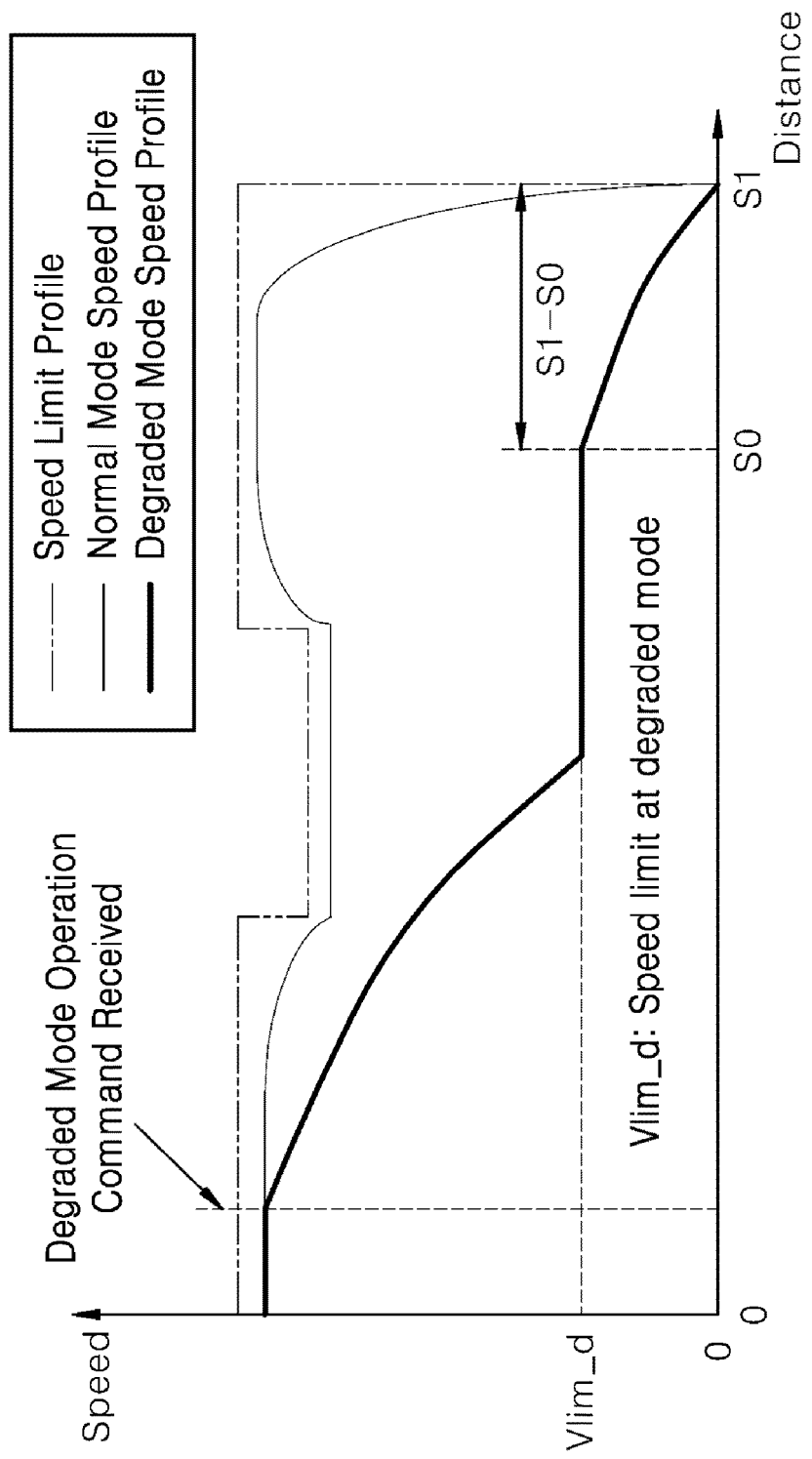
FIG. 5 is a speed-to-distance graph depicting travel of a train according to a travel speed profile in a degraded mode operation of an automatic train operation system operated due to braking performance degradation of the train according to an embodiment of the present invention.

FIG. 5 is a speed-to-distance graph depicting travel of a train according to a travel speed profile in a degraded mode operation of an automatic train operation system operated due to braking performance degradation of the train according to an embodiment of the present invention.

Referring to FIG. 5, in the normal mode, the travel speed profile generator 200 generates a normal mode travel speed profile such that the train travels at a speed approximating the speed limit profile received from the ATP system in the train, through the powering operation and coasting operation. Thereafter, the train speed controller outputs a powering command to a train powering apparatus 500 or a braking command or coasting command to the train brake 600 such that the train follows the travel speed profile. However, in the degraded mode, braking is limited in generating a travel speed profile since the degraded mode means that the train brake 600 is not exhibiting normal performance. That is, a degraded mode travel speed profile for moving the train to a safe place or desired place through the powering operation and coasting operation is generated. When a degraded mode operation command is received from the control system 1000, the degraded mode travel speed profile generates a powering profile for causing the current speed of the train to reach a degraded mode speed limit (Vlim_d in FIG. 5) through the coasting operation. After the profile reaches the degraded mode speed limit, a constant speed profile is generated to maintain the obtained speed. Finally, a coasting profile is generated to move the train to a stopping point through the coasting operation. To this end, the travel speed profile generator 200 may include a coasting travel distance calculator.

The coasting travel distance calculator calculates a coasting travel distance, which is the distance the train at the degraded mode speed limit travels until it stops through coasting. Herein, the coasting travel distance S1-S0 calculated by the coasting travel distance calculator is given by Equation 5 below.

$$S1 - S0 = \frac{Vlim\_d \times Vlim\_d}{2 \times A\_dec} \qquad \text{Equation 5}$$

In Equation 5, A_dec denotes a deceleration by resistance occurring during the coasting travel and exceeds 0.

When there is a remaining coasting travel distance S1-S0, the travel speed profile generator 200 generates a travel speed profile such that the train stops accelerating and starts a coasting travel.

The railroad database unit 400 includes information about a railroad along which the train travels, namely railroad information. Herein, the railroad information includes curvature information and railroad gradient information about the railroad along which the train travels.

In the normal mode, the travel speed controller 300 receives the current speed of the train, and outputs a coasting command by outputting a powering command to the train powering apparatus 500 or a braking command or no command to the train brake 600 such that the current speed of the train follows the travel speed profile. However, in the degraded mode, the ATO system determines that a fault has occurred in the brake of the train, and outputs a powering command to the train powering apparatus 500 or interrupts output to the train powering apparatus 500 such that the current speed of the train may follow the travel speed profile using only the powering command and coasting command. Since the travel speed profile is generated such that the train can reach the stopping point using only the powering operation and coasting operation, the train may travel according to the travel speed profile based only on the powering command and the coasting command.

Next, a fault diagnosis method for a brake of a train according to an embodiment of the present invention will be described with reference to the accompanying drawings. In the following description, elements identical to those of the fault diagnosis apparatus for a brake of a train described above will not be described or will be described briefly.

Figure 6:
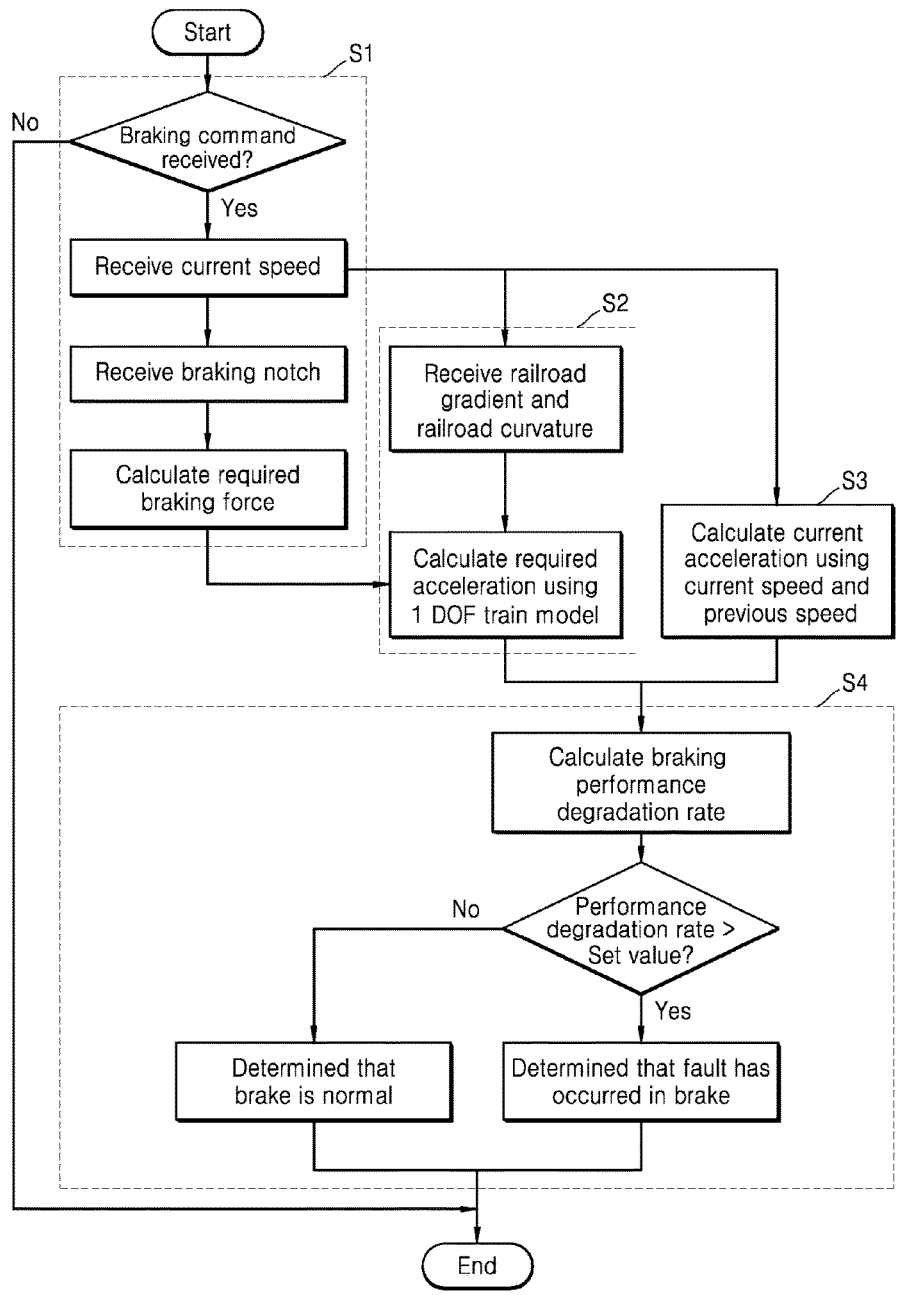
FIG. 6 is a flowchart illustrating a fault diagnosis method for a brake of a train according to an embodiment of the present invention.

FIG. 6 is a flowchart illustrating a fault diagnosis method for a brake of a train according to an embodiment of the present invention.

As shown in FIG. 6, the fault diagnosis method for a brake of a train according to an embodiment of the present invention includes calculating required braking force (S1), calculating a required acceleration (S2), calculating a current acceleration (S3), and monitoring brake performance (S4).

In calculating the required braking force (S1), the required braking force calculator 110 receives a braking command and calculates required braking force based on a current speed of the train and braking notch information calculated by the ATO system. To this end, the step of calculating required braking force (S1) includes determining whether or not a braking command is received, receiving the current speed of the train, and calculating required braking force.

In calculating the required acceleration (S2), the train model unit 120 calculates a required acceleration using the current speed of the train, required braking force, a railroad curvature and railroad gradient information. Herein, the required acceleration calculated by train model unit 120 is given by Equation 2 above.

In calculating the current acceleration (S3), the current acceleration calculator 130 calculates the current acceleration using the current speed information and previous speed information about the train. Herein, the calculated current acceleration is given by Equation 1 above.

In monitoring the brake performance (S4), the brake performance monitoring unit 140 monitors the brake performance of the train. The step of monitoring the brake performance (S4) includes calculating a performance degradation rate of a brake and determining a fault status of the brake.

In calculating the performance degradation rate of the brake, a brake performance degradation rate calculation module calculates the performance degradation rate of the brake. The calculated performance degradation rate may be estimated in Equation 4 above.

In determining the fault status of the brake, the fault status of the brake of the train is determined based on the performance degradation rate of the brake of the train calculated in the calculation of the performance degradation rate of the brake. That is, if the performance degradation rate is greater than or equal to a set value and performance degradation is sever, a brake fault determination module determines that a fault has occurred in the brake of the train.

Hereinafter, a description will be given of a method for automatically operating a train according to braking performance degradation of the train using the fault diagnosis method described above, with reference to the accompanying drawings. In the following description, elements identical to those of the fault diagnosis method described above will not be described or will be described briefly.

Figure 7:
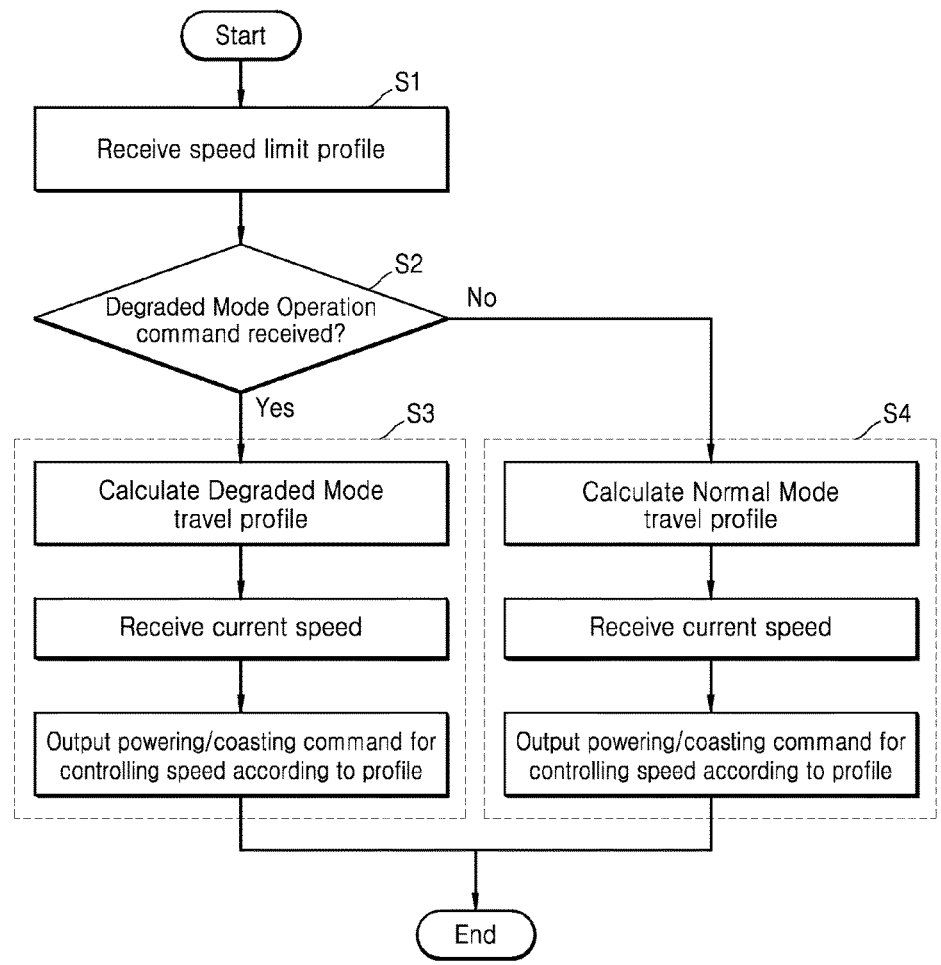
FIG. 7 is a flowchart illustrating a method for automatically operating a train according to braking performance degradation of the train according to an embodiment of the present invention.

FIG. 7 is a flowchart illustrating a method for automatically operating a train according to braking performance degradation of the train according to an embodiment of the present invention.

As shown in FIG. 7, the method for automatically operating a train according to braking performance degradation of the train according to an embodiment of the present invention includes receiving a speed limit profile (S1), determining whether or not a degraded mode operation command is received (S2), and executing a degraded mode (S3). The step of determining whether or not the degraded mode operation command is received includes executing a normal mode (S4) when the degraded mode operation command is not received.

In receiving the speed limit profile (S1), the ATO system receives a speed limit profile from the ATP system.

In determining whether or not the degraded mode operation command is received (S2), a travel speed profile generator determines whether or not the degraded mode operation command is received from a control system.

In executing the degraded mode (S3), if the travel speed profile generator receives the degraded mode operation command from the control system in the step of determining whether or not the degraded mode operation command is received (S2), a train speed controller drives the train in the degraded mode. To this end, the step of executing the degraded mode (S3) includes calculating a degraded mode travel speed profile, receiving the current speed of the train, and outputting a powering/coasting command for controlling the speed of the train according to the degraded mode travel speed profile.

In executing the normal mode (S4), the train speed controller drives the train in the normal mode if the travel speed profile generator does not receive the degraded mode operation command from the control system in the step of determining whether or not the degraded mode operation command is received (S2).

To this end, the step of executing the normal mode (S4) includes calculating a normal mode travel speed profile, receiving the current speed of the train, and outputting a powering/coasting/braking command for controlling the speed of the train according to the normal mode travel speed profile.

Those skilled in the art will appreciate that various substitutions, modifications, variations can be made to the present invention without departing from the technical spirit of the invention and that the present invention is not limited to the embodiments described above and the accompanying drawings.

What is claimed is:

1. An automatic train operation system operated due to braking performance degradation, comprising:
   a brake fault diagnosis unit to diagnose a fault status of a brake of a train;
   a travel speed profile generator configured to generate, when a fault occurs in the brake of the train, a degraded mode travel speed profile such that the train moves to a stopping point at a speed within a speed limit through a powering operation or a coasting operation; and
   a travel speed controller configured to control a travel speed of the train according to the travel speed profile,
   wherein the degraded mode travel speed profile comprises:
      a powering profile for powering the train up to a degraded mode speed limit, the degraded mode speed limit being lower than the speed limit;
      a constant speed profile for repeating the powering operation and the coasting operation to maintain the train at the degraded mode speed limit; and
      a coasting profile for stopping the train at a stopping point through the coasting operation.

2. The automatic train operation system according to claim 1, wherein the brake fault diagnosis unit comprises:
   a required braking force calculator configured to calculate expected required braking force of the train based on the current speed information about the train and braking notch information;
   a current acceleration calculator configured to calculate a current acceleration based on the current speed information and previous speed information about the train;
   a train model unit configured to calculate a required acceleration based on the current speed information about the train, the required braking force, railroad curvature information and railroad gradient information; and
   a brake performance monitoring unit configured to determine that a fault has occurred in the brake of the train when a difference between the current acceleration and the required acceleration is greater than or equal to a reference value.

* * * * *